(12) United States Patent
Hunter et al.

(10) Patent No.: US 7,756,839 B2
(45) Date of Patent: Jul. 13, 2010

(54) VERSION TOLERANT SERIALIZATION

(75) Inventors: Jason T Hunter, Redmond, WA (US); Ramachandran Venkatesh, Bellevue, WA (US); David J Nettleton, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1130 days.

(21) Appl. No.: 11/094,923

(22) Filed: Mar. 31, 2005

(65) Prior Publication Data
US 2006/0253496 A1 Nov. 9, 2006

(51) Int. Cl.
*G06F 17/20* (2006.01)
*G06F 15/16* (2006.01)

(52) U.S. Cl. .................. 707/687; 707/690; 707/694; 707/695

(58) Field of Classification Search .................. 707/203, 707/687, 690, 694, 695
See application file for complete search history.

(56) References Cited

U.S. PATENT DOCUMENTS

| | | | |
|---|---|---|---|
| 4,658,370 A | 4/1987 | Erman | |
| 5,315,709 A | 5/1994 | Alston | |
| 5,548,761 A | 8/1996 | Balasundaram | |
| 5,937,410 A | 8/1999 | Shen | |
| 6,272,521 B1 * | 8/2001 | Jablonski et al. | 709/200 |
| 6,553,141 B1 | 4/2003 | Huffman | |
| 6,910,182 B2 | 6/2005 | Huang | |
| 7,096,229 B2 | 8/2006 | Dettinger | |
| 2002/0194220 A1 | 12/2002 | Sluiman | |
| 2003/0018964 A1 | 1/2003 | Fox | |
| 2003/0051226 A1 | 3/2003 | Zimmer | |
| 2003/0121026 A1 | 6/2003 | Wang | |
| 2003/0167444 A1 | 9/2003 | Zorc | |
| 2004/0015511 A1 | 1/2004 | Seefeldt | |
| 2004/0044990 A1 | 3/2004 | Schloegel | |
| 2004/0073870 A1 | 4/2004 | Fuh | |
| 2004/0139126 A1 * | 7/2004 | Thacker et al. | 707/203 |
| 2005/0014494 A1 | 1/2005 | Owen | |
| 2005/0050020 A1 | 3/2005 | Oki | |
| 2005/0050073 A1 | 3/2005 | Demiroski | |
| 2005/0091255 A1 | 4/2005 | Rajan | |
| 2005/0262113 A1 | 11/2005 | Arora | |
| 2005/0262378 A1 | 11/2005 | Sleeman et al. | |
| 2006/0064425 A1 | 3/2006 | Kakivaya | |
| 2006/0184571 A1 | 8/2006 | Liu | |

(Continued)

OTHER PUBLICATIONS

Ferrandia, et al., "Implementing Lazy Database Updates for an Object Database System", In Proceedings of the 20th International Conference on Very Large Data Bases, 1994, pp. 261-272, Santiago, Chile.

(Continued)

*Primary Examiner*—John E Breene
*Assistant Examiner*—Alex Gofman
(74) *Attorney, Agent, or Firm*—Workman Nydegger

(57) ABSTRACT

Systems and methodologies that facilitate data handling among participants with mismatched schema sets of an extensible data model, via employing a versioning component. The versioning component can identify and separate the mismatched and matched data, and direct the mismatched portion to a bit bucket component. The bit bucket component can further persistently store the mismatched data, to enable interaction among participants with mismatched data types. The data can be re-integrated to ensure that round trip data is available to the next participant.

14 Claims, 9 Drawing Sheets

U.S. PATENT DOCUMENTS

2006/0195459 A1    8/2006    Nori
2006/0195477 A1    8/2006    Deem
2006/0200486 A1    9/2006    Castro

OTHER PUBLICATIONS

D. Garlan, et al., "TransformGen: Automating the Maintenance of Structure-Oriented Environments", ACM Transactions on Programming Languages and Systems, May 1994, pp. 727-774, vol. 16, No. 3.

B.S. Lerner, "A Model for Compound Type Changes Encountered in Schema Evolution", ACM Transactions on Database Systems, pp. 83-127, vol. 25, No. I, Mar. 2000.

A.H. Skara, "The Management of Changing Types in an Object-Orientated Database", In Proceedings of the Conference on Object-Orientated Programming Systems, Language and Applications, OOPSLA'86, Apr. 1986, pp. 483-495, ACM.

Simonet. "An Extension of HM(X) with Bounded Existential and Universal Data-Types" (2003) Proceedings of the 8th ACM SIGPLAN International Conferences on Functional Programming, 15 pages.

Shoshani. "A Logical-Level Approach to Data Base Conversion" (1975) Proceedings of 1975 ACM SIGMOD International Conference on Management of Data, 11 pages.

Buneman. "Inheritance and Persistence in Data Base Conversion" (1987) ACM Computing Surveys, 12 pages.

Office Action dated Oct. 2, 2007 cited in U.S. Appl. No. 11/128,893.
Office Action dated Jul. 3, 2008 cited in U.S. Appl. No. 11/128,893.
Office Action dated Mar. 6, 2009 cited in U.S. Appl. No. 11/128,893.
Office Action dated Aug. 15, 2008 cited in U.S. Appl. No. 11/562,438.
Office Action dated Mar. 9, 2009 cited in U.S. Appl. No. 11/562,438.
Office Action dated Jul. 13, 2009 cited in U.S. Appl. No. 11/562,438.
Office Action dated Oct. 5, 2007 cited in U.S. Appl. No. 11/185,155.
Office Action dated Mar. 5, 2008 cited in U.S. Appl. No. 11/185,155.
Office Action dated Jul. 18, 2008 cited in U.S. Appl. No. 11/185,155.
Office Action dated Mar. 13, 2009 Cited in U.S. Appl. No. 11/18,155.
Notice of Allowance dated Oct. 1, 2009 cited in U.S. Appl. No. 11/128,893.
Office Action dated Feb. 3, 2010 cited in U.S. Appl. No. 11/562,438.

\* cited by examiner

| DATA TYPE | CLIENT REPRESENTATION | BIT BUCKET COMPONENT |
|---|---|---|
| TYPE B (Where A is $V_1$) | TYPE A $V_1$ (Diced) | TYPE B Properties |
| TYPE A $V_2$ | TYPE A $V_1$ (Sliced) | TYPE A Properties Introduced in $V_2$ |
| TYPE B (Where A is $V_2$) | TYPE A $V_1$ (First Diced to Type A, then Sliced to TYPE A $V_1$) | TYPE B Properties and Type A Properties Introduced in $V_2$ |

Fig. 5

VERSION TOLERANT SERIALIZATION

TECHNICAL FIELD

The subject invention relates generally to data handling and data transfer among participants, and in particular to a client-store-data interaction, which employs mismatched schema sets of an extensible data model.

BACKGROUND OF THE INVENTION

Increasing advances in computer technology (e.g., microprocessor speed, memory capacity, data transfer bandwidth, software functionality, and the like) have generally contributed to increased computer application in various industries. Ever more powerful server systems, which are typically configured as an array of servers, are commonly provided to service requests originating from external sources such as the World Wide Web, for example. As local Intranet systems have become more sophisticated, thereby requiring servicing of larger network loads and related applications, internal system demands have grown accordingly as well. As such, much business data is stored in data stores, under a management system.

The amount of available electronic data is continuously growing, and it has become ever increasingly important to store such data in data stores in a manageable manner, which facilitates user friendly, and quick data searches and retrieval. In general, a data store can be referred to as an organized collection of information with data structured such that a computer program, for example, can quickly search and select desired pieces of data. Data within a data store can be organized via one or more tables, wherein respective tables comprise a set of records, and a record can comprise a set of fields. Records are commonly indexed as rows within a table and the record fields are commonly indexed as columns, so that a row/column pair of indices can reference a particular datum within a table. Typically, such data stores can be viewed as organized collection of related information stored as "records" having "fields" of information therein.

At the same time, conventional data stores and operating systems have typically relied on multiple incompatible storage for data, including; the registry, event log messages, contact information, and e-mail, or simply have used multiple flat files for data such as images and audio. For example, in conventional data stores, stored contents are in general treated as separate entities, even though they are interrelated at some level. Accordingly, when a large number of items exist, it can become important to have a flexible and efficient mechanism to search for particular items based on their properties and content. For example, it can be desirable for knowledge workers to be able to search for contents, independent of format and regardless of what type of a file a particular content is, and what application created that.

Given a new file system that operates based on relational objects with an extensible data type, new challenges can arise. For example, in such environments, a data model can play an important role in the way that participants interact with the database. Moreover, a manner for which an application stores and retrieves data can be governed by the data model.

Interactions involved with data handling of such a data store can involve various parties and different data models. Accordingly, existence of different models can hinder proper interaction between the participants, as data may not be properly representable to all parties involved. Moreover, converting from one data representation to another can typically become time consuming and resource intensive, while at the same time be fraught with conversion problems, and in some cases, totally impracticable due to the complexity.

Therefore, there is a need to overcome the aforementioned exemplary deficiencies associated with conventional systems and devices.

SUMMARY OF THE INVENTION

The following presents a simplified summary of the invention in order to provide a basic understanding of one or more aspects of the invention. This summary is not an extensive overview of the invention. It is intended to neither identify key or critical elements of the invention, nor to delineate the scope of the subject invention. Rather, the sole purpose of this summary is to present some concepts of the invention in a simplified form as a prelude to the more detailed description that is presented hereinafter.

The subject invention provides for systems and methods of data handling that enable interaction of three participants that share a common data model. Typically, a data model includes a data definition language and a data manipulation language. The data definition language further includes a core collection of schema together with an additional set of extensible schema, which collectively comprises a schema set that defines a type hierarchy. The interactions among the three participants, namely: client-store-data, include references to mismatched schema sets, which are subsets of the common data model. It is to be appreciated that the terms client and store as used herein are merely indicative of the process, and do not convey any additional behaviors, features, and the like, which may be associated with a client/server relationship.

According to one aspect of the invention, a conflict in the interaction between the participants is resolved via employing a versioning component. Such versioning component can identify and separate the mismatched and matched data, and direct the mismatched portion to a bit bucket component. The bit bucket component can further persistently store the mismatched data, whereby even though such data is not representable, it nonetheless is maintained throughout the serialization and deserialization processes required for moving data between the client and the store. Accordingly, when a type mismatch occurs between the client and the store, the client can continue interacting with the store using the available data types. The format of the bit bucket can be in the same binary format that serialization occurs, or in XML (extensible Markup Language) or in any other equally expressible form. In addition, data in the bit bucket component can be programmed against, for example via XML.

The extensible data model of the subject invention exists as a common thread among various participants in a loosely coupled system, wherein various data types can be derived and/or disseminated from the single data type that is understood by all participants. As such, both on the client side and on the store side, data can be divided into matched and mismatched, wherein a rich programming environment can be provided for the matched data. Moreover, even though the exact semantics for the mismatched data may not be readily available, nonetheless a structure for such mismatched data at a very loose level is known (e.g., associated properties), and can be employed in a generic programming environment.

In a related aspect, various data transformations are performed on the data to enable proper representation of such data to the client or the store, as a mismatch can occur if either the client, or the store, or the data do not share a same version. The subject invention employs a dicing operator and/or a slicing operator to designate what data is to be moved to the bit bucket and what data is directly representable. Typically, the slicing procedure can filter portions of the data not representable because an earlier version of the type is available. Likewise, the dicing procedure filters portions of the data not representable because a type referenced is not available. All types must typically be derived from an abstract object that is always available, and has no properties nor is versioned. It is to be appreciated that such dicing/slicing operators can function at multiple levels, and in a plurality of nested levels.

According to a further aspect of the subject invention, a discovery component can be provided to identify referenced schemas in the data on which the versioning component is operating, and which are not currently in the participants schema set. The discovery component then attempts to locate such schemas. For example, when the schemas are represented as XML Schema Definition (XSD) the discovery component can discover an XSD on the web that corresponds to the schema.

Moreover, an update component can leverage the discovery component, to permit new types of data to be added to the current participants schema set as those types are discovered from the data.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

BRIEF DESCRIPTION OF THE DRAWINGS

FIG. 5 illustrates an exemplary representation of data types in accordance with a particular aspect of the subject invention.

DETAILED DESCRIPTION OF THE INVENTION

Figure 1:
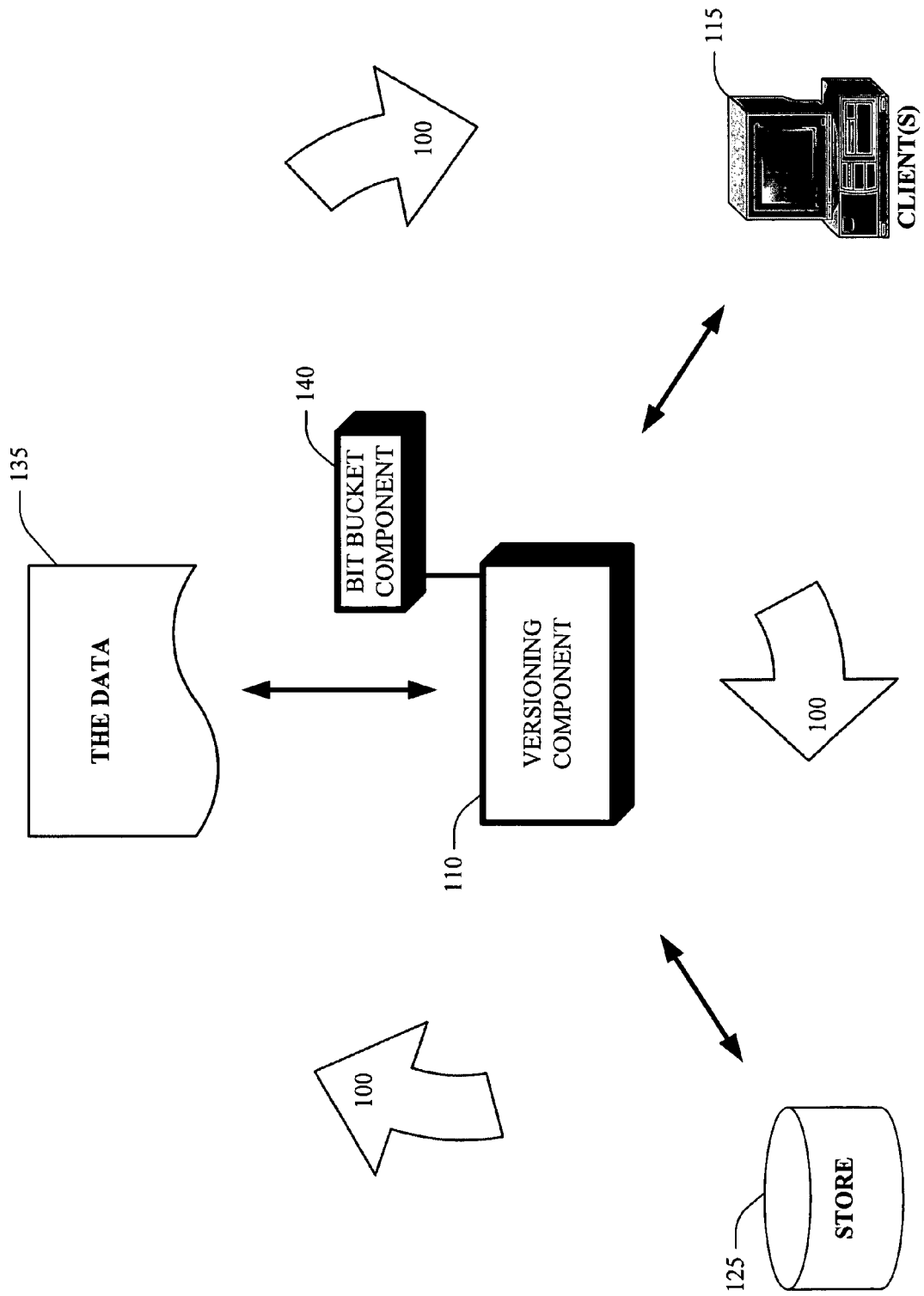
FIG. 1 illustrates a schematic block diagram of a versioning component and a bit bucket component that operate in a store-client-the data arrangement, in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal).

The subject invention enables an interaction of mismatched schema sets for an extensible data model among a client-store-the data by employing a versioning component and bit bucket component. Referring initially to FIG. 1, there is illustrated a versioning component 110 that can identify and separate the mismatched and matched data during an interaction 100 of the various entities. The mismatched data can then be persistently stored in a bit bucket component 140, whereby even though such data is not representable, it nonetheless is maintained throughout serialization and deserialization processes required for moving data between the client 115 and the store 125.

In general, three parties can participate in the interaction 100, namely: the client 115, the store 125, and the data 135. The data 135 can be defined through a set of schema that participate in a common data model, each schema can define a set of types that collectively form a type hierarchy across a schema set. Moreover, the data model can be extensible through the introduction of new schema, which extends at least one existing schema. Additional new versions of schema may be created that evolve (additively) an existing schema. As such, a common data model exists that acts as a thread amongst all the participants. Even though all the sources/participants may not have extended the common data model at the same time, nonetheless no two sources can attempt to accomplish the same extension in different disparate ways. Moreover, although the exact semantics for the mismatched data may not be readily available, nonetheless a structure for such mismatched data at a very loose level is known (e.g., associated properties), and can be employed in a generic programming environment.

According to one aspect of the subject invention, when creating a schema, two sets of type definitions are typically generated and one is implied. For example, the store 125 (server) definition and the client 115 definition are generated, and the Data Contract can be implied. As such, the store definition describes the basic form (e.g., the physical structure) of each type and any required metadata or store-side business logic needed for storage and manipulation in a data store (e.g., a relational database).

Likewise, the client definition can describe the basic form (and any required additional business logic or other executable functionality) that allows the client applications to program and interact with the data 135. The store definition can then be installed in to the store 125, whereas the client definition can be redistributed to client machines 115 (e.g., in to the application directory). In particular, the data itself is an instantiation of the Data Contract, wherein such Data Contract is implied by both the server and client definitions, because both definitions derive from the same schema description.

Versioning scenarios can emerge when during the interaction 100 the store 125, the client 115 and the data 135 can reference different sets and versions of schema. As such, a mismatch can occur if the subset exercised during an interaction 100 involving such three schema sets fail to match. A mismatch can either be due to a disparity in the version of a definition, and/or due to a missing definition. Such mismatch can occur when a version of a type is available to at least of one of the parties, and is different from that of the other parties, or when a type is available to at least one party but not all.

For example, in case of the client 115 interacting with the store 125, the various mismatch modes can include: the client 115 and the data 135 reference the same types at the same version, but the store 125 does not; the client 115 and the store 125 reference the same types at the same version, but the data 135 does not; the store 125 and the data 135 reference the same types at the same version, but the client 115 does not; and all three parties, the client 115, the store 125, and the data 135 reference different sets of types or versions. By employing the versioning component 110 and the bit bucket component 140, the subject invention enables the store 125 to persist data and offer manipulation over the data during the interaction 100.

As data moves between the client 115 and the store 125, the data can undergo a process of serialization and deserialization. Typically, a goal of serialization is to capture a consistent copy of all components of an item for the purpose of transporting the item and to reconstruct an entire item at its destination. Throughout this process the data itself references a constant set of types. If the store 125 or the client 115 does not have available one or more of these types, then some of the data may not be representable in the rich programming model of that party and therefore is only representable in the generic programming model. By employing the versioning component 110 and the bit bucket component 140, the subject invention can maintain the fidelity of the data throughout the transportation process.

The maintenance of the non representable portion of the data is known as "round-tripping", and the bit bucket component 140 supplies a storage location for the round-tripped data. Round-tripping typically ensures that during the interaction 100, and as data is moved between parties with varying capabilities to represent data, the data maintains its fidelity. Such characteristic enables the composition of operations performed by various instantiations of each party with varying capabilities in a long stream that collectively perform the desired operation, without typically requiring that all parts of the operation remain synchronized on schema or versions.

As illustrated in FIG. 1, the bit bucket component 140 can persistently store the mismatched data, whereby even though such data is not representable in the rich programming model, it nonetheless is maintained throughout serialization and deserialization processes, which is required for the moving of data between the client 115 and the store 125. Accordingly, when a type mismatch occurs between the client 115 and the store 125, the client 115 can continue interacting with the store 125 using the available data types. The format of the bit bucket component 140 can be in the same binary format that serialization occurs, or in XML (Extensible Markup Language), or in any other equally expressible form. In addition, data in the bit bucket component 140 can be programmed against, for example via XML, where XML documents using schema constructs of an XML schema language can be used to constrain and document the meaning, usage, and relationships of data types, elements and their content, attributes and their values, entities, contents and notations. Thus, in general any computer system that can access an XML schema or any other equally expressible form can process documents in accordance with the schema. Furthermore, typically any computer system that can access a schema can compose or modify documents for use by other computer systems that can also access the schema. A schema can be utilized to define virtually any data type including logical, binary, octal, decimal, hexadecimal, integer, floating-point, character, character string, user-defined data types, and combinations of these data types used to defined data structures. For XML for example, XML elements and attributes can be defined to represent data types that are defined by a schema.

Figure 2A:
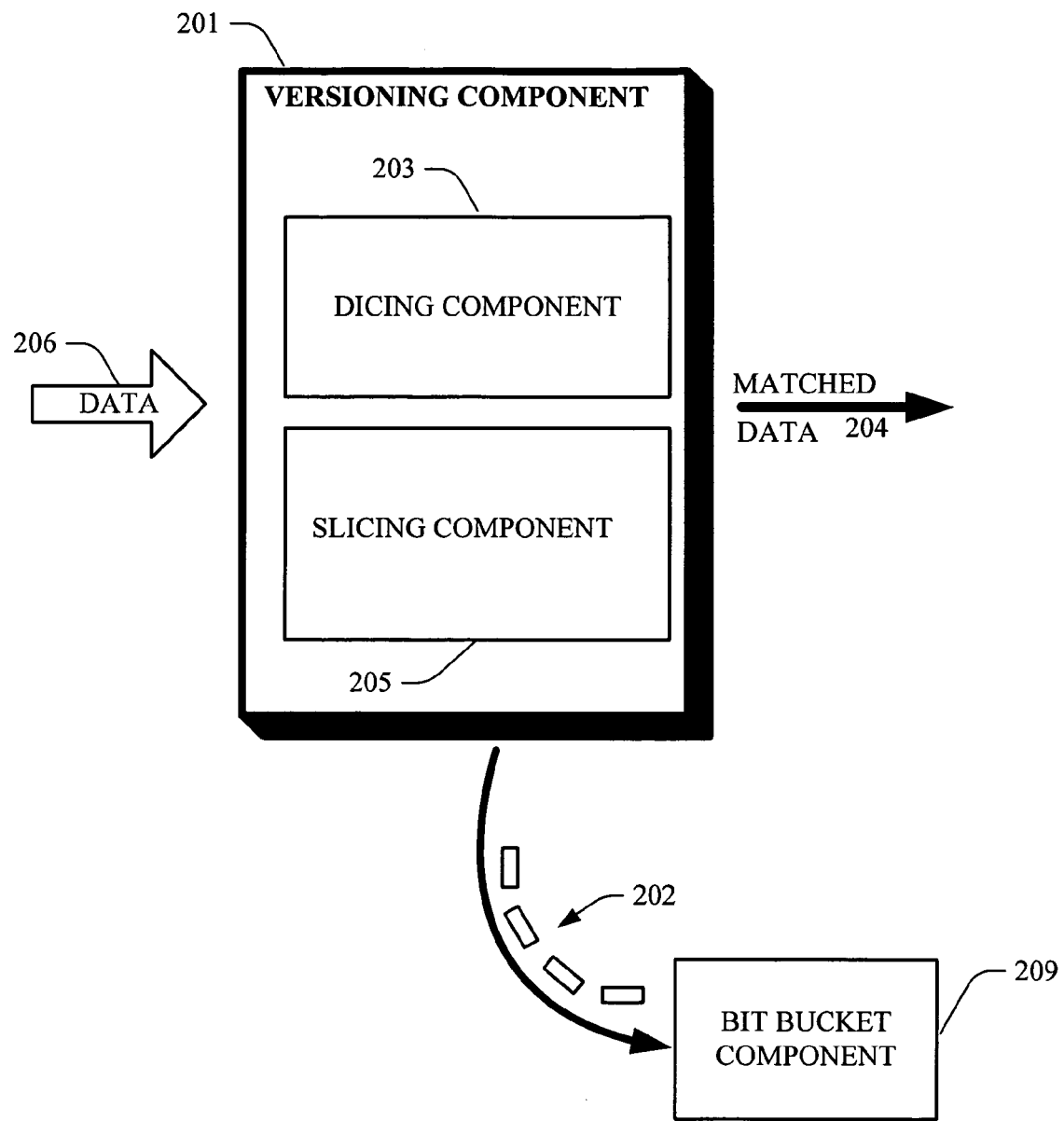
FIGS. 2a & 2b illustrate block diagrams of a versioning component according to exemplary aspects of the subject invention.

FIG. 2*a* illustrates a block diagram of a versioning component in accordance with an exemplary aspect of the subject invention. As explained in detail infra, the versioning component 201 can identify and separate the mismatched data 202 and matched data 204, and direct the mismatched 202 portion to a bit bucket component 209. The bit bucket component 209 can further persistently store the mismatched data 202, whereby even though such data 202 is not representable in the rich programming model, it nonetheless is maintained throughout serialization and deserialization processes required for moving data between the client and the store (not shown). Accordingly, when a type mismatch occurs between the client and the store, the client can continue interacting with the store using the available data types. The extensible data model of the subject invention can exist as a common thread among various participants in a loosely coupled system, wherein various data types must be derived and/or disseminated from a single data type that is understood by all participants. As such, both on the client side and on the store side, data can be divided into matched and mismatched, wherein a rich programming environment can be provided for the matched data and a generic programming environment provided for the mismatched data.

As illustrated in FIG. 2*a*, the versioning component 201 can include a dicing component 203 and a slicing component 205. Such components can operate on a data stream 206 to designate what data is to be moved to the bit bucket component 209 and what data is directly representable. Typically, the slicing component 205 can filter portions of the data not representable because an earlier version of the data type is available. Likewise, the dicing component 203 can filter portions of the data not representable because a data type referenced is not available. In general, all such data types must be derived from an abstract object that is always available, and has no properties nor is versioned and provides the base case for the slicing and dicing algorithms. It is to be appreciated that the dicing component 203 and the slicing component 205 can function at multiple levels, and in a plurality of nested levels, as described in detail infra.

Figure 2B:
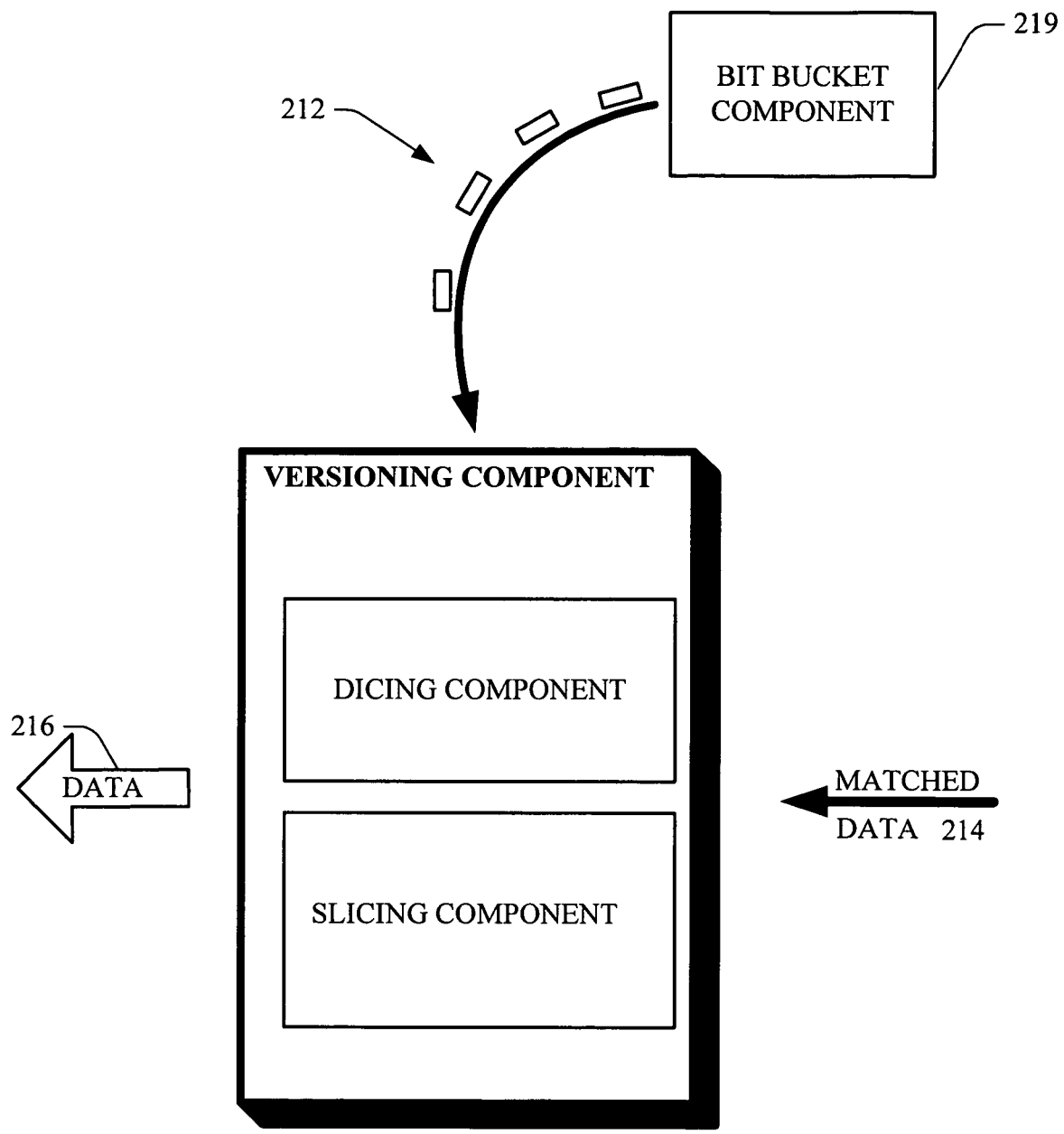

Likewise, and as illustrated in FIG. 2*b*, data that is persisted by the bit-bucket component 219 can be re-integrated with the directly representable data 214, to reconstitute a full fidelity serialized form of the data 216. Such re-integration of data facilitates completion of the serialize/deserialize process and in general guarantees that the round trip data is available to the next participant.

Figure 3A:
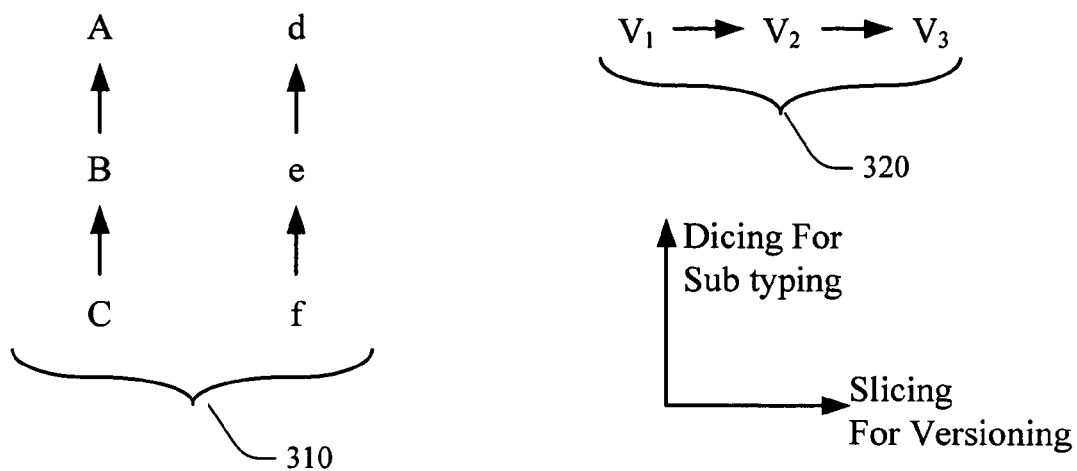
FIGS. 3a & 3b illustrate a data type and versioning scenario with a slicing and dicing procedure applied to an object tree, according to a particular aspect of the invention.
Figure 3B:
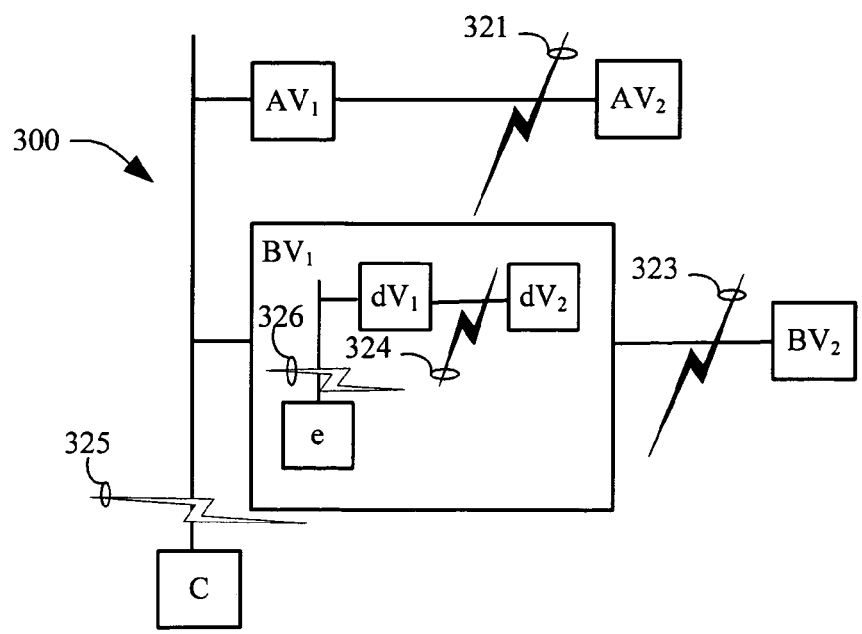

Referring now to FIGS. 3a & 3b, an object tree 300 with a plurality of associated types is illustrated that can be subject to a dicing/slicing operation in accordance with an aspect of the subject invention. Typically, objects can be packages of data and functionality within single units or items, and can be associated with identities that are separate from identities of other objects, although objects can relate to each other via messages. For example, messages can be instructions that are received or delivered by object(s) based upon an object's (or other object's) data and/or functionality (e.g., methods). In addition, data within objects can include numbers, literal strings, variables, references, and other suitable data. Such data can relate to properties of the objects, as class definitions and object-dependency indicia.

Structure and behavior of objects are defined by a class, which is a definition of all objects of a specified type. Objects are explicitly created as a function of a class, and an object so created is considered to be an instance of such class. Objects can further be associated with method pointers, member access control, implicit data members utilized to locate instances of a class in a class hierarchy, and the like. Moreover, an object's data and/or functionality can be based on data and/or functionality of disparate objects(s), from which the former object inherits. Inheritance enables commonalities amongst differing types of objects to be expressed a single time and thereafter utilized multiple times in multiple contexts.

As illustrated in FIG. 3a, the dicing/slicing operations can function at multiple levels, and in a plurality of nested levels, rather than merely at a data chunk. An exemplary sub typing 310 can occur when data type "C" derives from data type "B", which in turn can be derived from data type "A". Similarly, data type "f" can be derived from data type "e" which is derived from data type "d".

Likewise, an exemplary versioning 320 can occur when version 1 ($V_1$), version 2 ($V_2$), and version 3 ($V_3$) each extend respectively the previous. Accordingly, six types of data with each having three different versions, for a total of eighteen possible types any combination of which can appear in an associated object tree. All sub types and/or versions must be derived from an abstract object that is always available, and has no properties nor is versioned. For any given participant (e.g., the client or the store), a subset of such eighteen combinations can exist, and the dicing and/or slicing operation of the subject invention supplies representable data to any of the participants involved in handling the data.

For example, if serialized object tree 300 of FIG. 3b is presented to a client that merely understands version 1 of data type "A", version 1 of data type "B", and version 1 of data type "d" then slice operations are performed at 321, 323 and 324, with dice operations performed at 325 and 326. The diced/sliced off potions (e.g., all data type "C" "e", $AV_2$, and the like) that fail to match the data representation of such client, are then forwarded to the bit bucket component (not shown). As such, the dicing/slicing operations of the subject invention can function at multiple levels, and/or in a plurality of nested levels.

Figure 4:
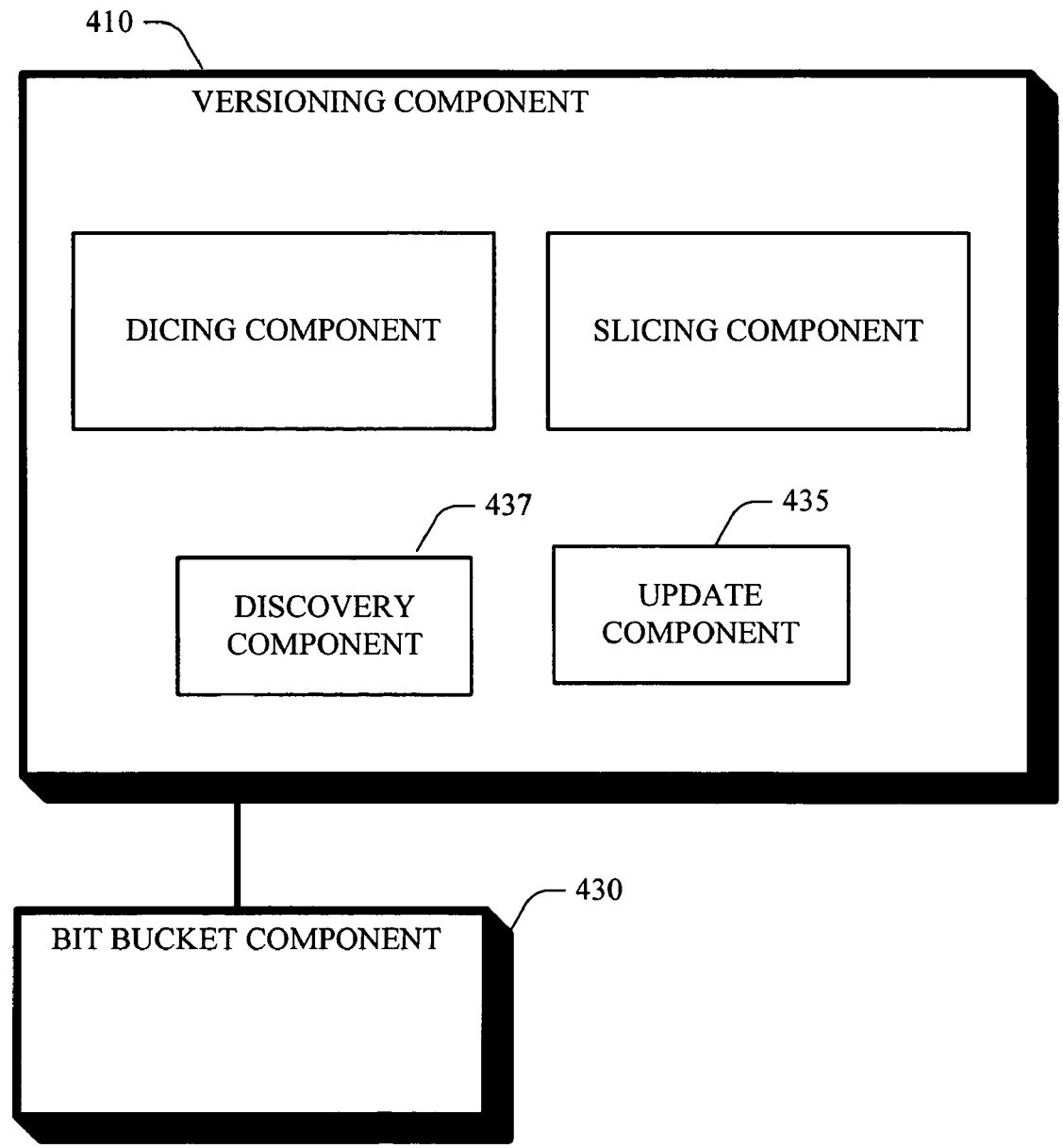
FIG. 4 illustrates a versioning and a bit bucket component arrangement according to a particular aspect of the subject invention.

FIG. 4 illustrates a versioning and a bit bucket component arrangement according to a particular aspect of the subject invention. The versioning component 410 can further include an update component 435 and a discovery component 437. The discovery component 437 can be provided to identify referenced schemas in the data on which the versioning component 410 is operating and which are not currently in the participants schema set. The discovery component 437 can then attempt to locate those schemas. The update component 435 can leverage the discovery component 437 to permit new types to be added to the current participant's schema set as those types are discovered from the data. The data in the bit-bucket component 430 can be stored in any form that supports a query API (Application Program Interface). One such form can be and eXtensible Mark up Language (XML). XML offers a query model through XPath and XQuery, and has the additional benefit that XSD (XML Schema Definition) validation can then be applied to bit-bucket data. For example, when the data in the bit-bucket component 430 is in a form accepted by an XML Schema Definition (XSD), based on the schema, the discovery component 437 can discover an XSD on the web that corresponds to the schema.

FIG. 5 illustrates an exemplary chart for a representation of: data types, the client representation, and the bit bucket, in accordance with a particular aspect of the subject invention. Such exemplary chart is based on occurrence of a mismatch between client and the server, wherein the client is missing a type (type B) and a version (type A properties introduced in version 2), and the store has types 'Type A v2' and 'Type B' available—(while the client has only 'Type A v1' available). Accordingly, as the object with data type 505 is exchanged between store and client, such object is subject to slicing and dicing until the data can be represented in the client's programming model 510. Accordingly, the remaining data is placed in the client's bit-bucket 520. As illustrated in 510, all data is represented as a 'Type A v1' object, since such type is the only type available to this client.

In general, for all cases the client is able to operate on the objects as a 'Type A v1', with the remaining data being cached in a client-side bit bucket 520. The data represented at the client can be manipulated using the client's normal programming model. Yet, data in the client-side bit bucket 520 could be programmed by employing the client-side bit bucket programming model. As the object is passed from the client to another party (e.g., back to the store, on to another client, and the like) the object is reformed in its complete shape by reintroducing the data from the bit-bucket at the appropriate places in the serialized form, thus ensuring the correct round-tripping of all data. Each party in the stream performs slicing and dicing according to the types available to it.

In a related aspect, if the store is missing a type it typically can slice and dice data in an algorithm analogous to that described above. It is to be appreciated that a symmetric programming model for both queries and updates (including partial updates) to data both in and out of the bit bucket can further be provided, to enable fully version tolerant clients. Moreover, when employing mixed interactions (e.g., interactions that involve both the standard programming model and the bit bucket), clients can query for data on conditions defined over properties that are not available in the main store programming model. Subsequently, such clients can receive the data associated with these queries, and perform updates to all portions of the data.

Figure 6:
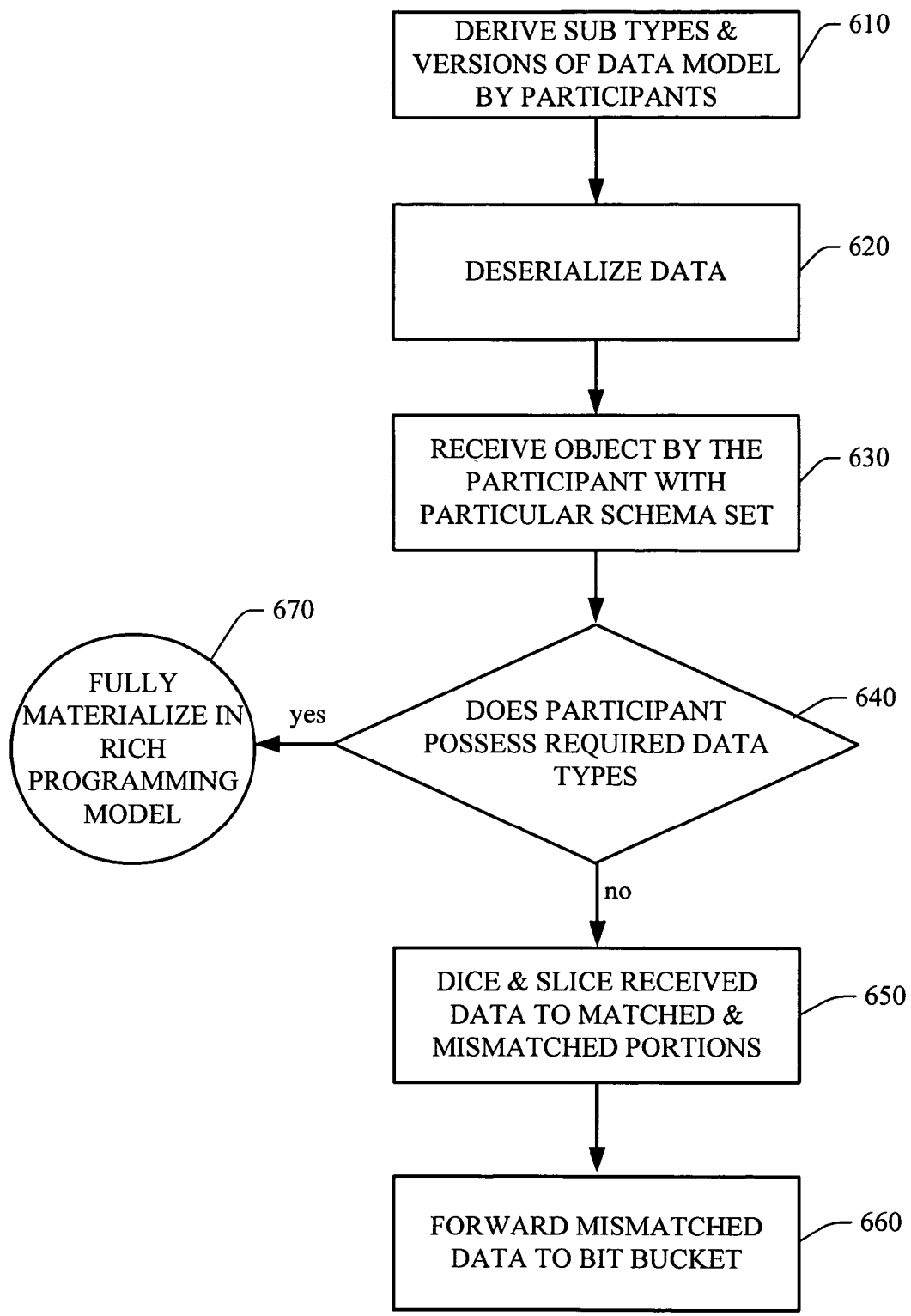
FIG. 6 illustrates a flow chart for a methodology of versioning in accordance with an aspect of the subject invention.

FIG. 6 illustrates an exemplary flow chart of a dicing/slicing operation in accordance with an aspect of the subject invention. While the exemplary method is illustrated and described herein as a series of blocks representative of various events and/or acts, the invention is not limited by the illustrated ordering of such blocks. For instance, some acts or events may occur in different orders and/or concurrently with other acts or events, apart from the ordering illustrated herein, in accordance with the invention. In addition, not all illustrated blocks, events or acts, may be required to implement a methodology in accordance with the invention. Moreover, it will be appreciated that the exemplary method and other methods according to the invention may be implemented in association with the method illustrated and described herein, as well as in association with other systems and apparatus not illustrated or described.

Initially and at 610, each of the participants in data handling (e.g., a client and a store) can derive subtypes and versions of a data model. All types must be derived from an abstract object that is always available, and has no properties nor is versioned. For example, the extensible data type must exist as a common thread among various participants in a loosely coupled system, wherein various data types must be derived and/or disseminated from a single data type that is understood by all participants. An instance of data is created by a participant and such data is serialized for transfer (not shown). Next and at 620, as data moves between the participants, such data can undergo a process of deserialization. Throughout this process the data itself can reference a constant set of types. At 630 such transferred data is received by a participant, and a determination can be made whether such participant possesses the required data types, at 640. If yes, the method ends at 670 with the data being fully materialized in the rich programming model. Otherwise, the versioning component identifies and separates the mismatched and matched data via a dicing/slicing operation at 650. Subsequently, the mismatched data can be directed to a bit bucket component at 660.

Figure 7:
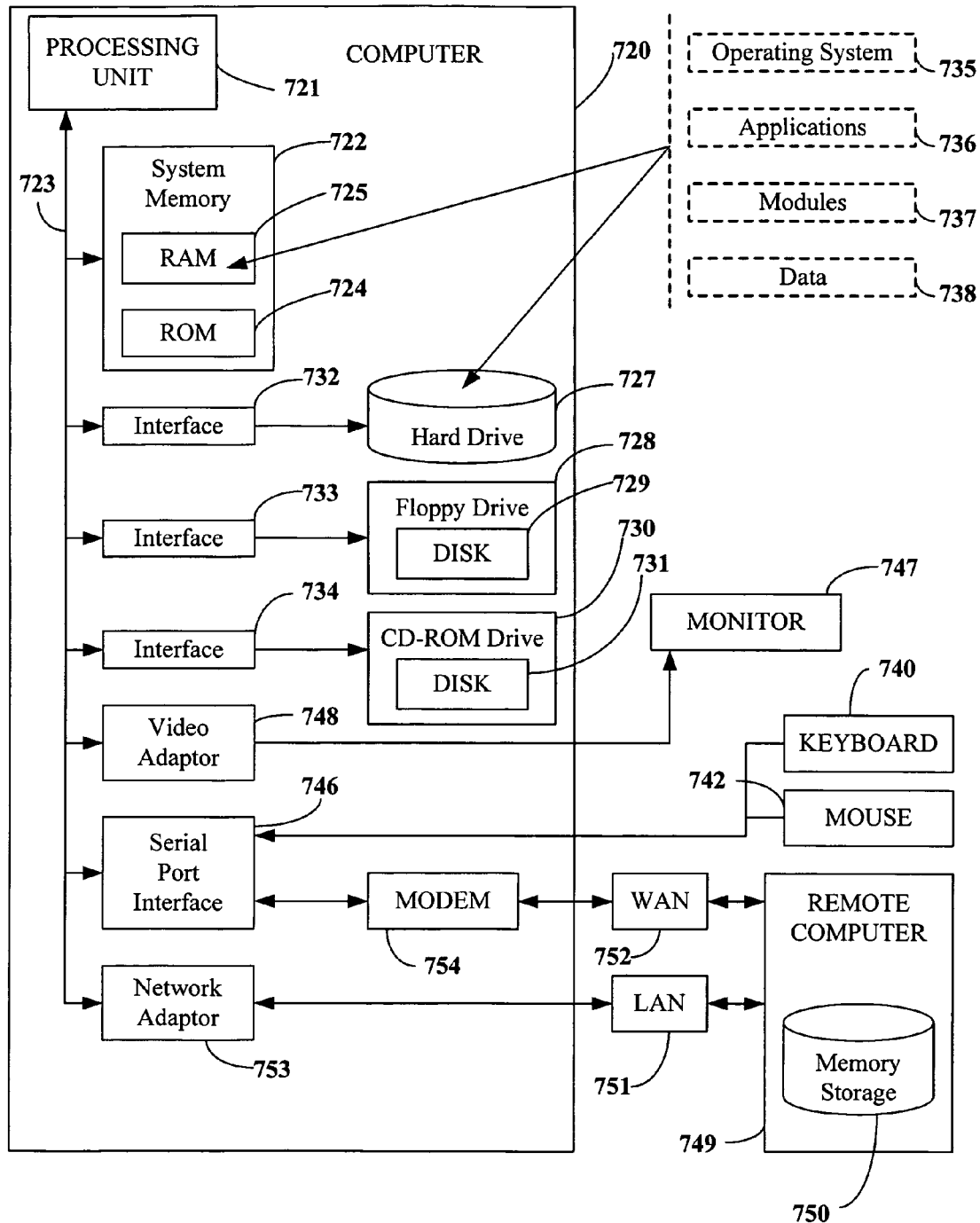
FIG. 7 illustrates a brief, general description of a suitable computing environment, wherein the various aspects of the subject invention can be implemented

Referring now to FIG. 7, a brief, general description of a suitable computing environment is illustrated wherein the various aspects of the subject invention can be implemented. While the invention has been described above in the general context of computer-executable instructions of a computer program that runs on a computer and/or computers, those skilled in the art will recognize that the invention can also be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like. As explained earlier, the illustrated aspects of the invention can also be practiced in distributed computing environments where tasks are performed by remote processing devices that are linked through a communications network. However, some, if not all aspects of the invention can be practiced on stand-alone computers In a distributed computing environment, program modules can be located in both local and remote memory storage devices. The exemplary environment includes a computer 720, including a processing unit 721, a system memory 722, and a system bus 723 that couples various system components including the system memory to the processing unit 721. The processing unit 721 can be any of various commercially available processors. Dual microprocessors and other multi-processor architectures also can be used as the processing unit 721.

The system bus can be any of several types of bus structure including a USB, 1394, a peripheral bus, and a local bus using any of a variety of commercially available bus architectures. The system memory may include read only memory (ROM) 724 and random access memory (RAM) 725. A basic input/output system (BIOS), containing the basic routines that help to transfer information between elements within the computer 720, such as during start-up, is stored in ROM 724.

The computer 720 further includes a hard disk drive 727, a magnetic disk drive 728, e.g., to read from or write to a removable disk 729, and an optical disk drive 730, e.g., for reading from or writing to a CD-ROM disk 731 or to read from or write to other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer-readable media provide nonvolatile storage of data, data structures, computer-executable instructions, etc. for the computer 720. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment, and further that any such media may contain computer-executable instructions for performing the methods of the subject invention.

A number of program modules can be stored in the drives and RAM 725, including an operating system 735, one or more application programs 736, other program modules 737, and program data 738. The operating system 735 in the illustrated computer can be substantially any commercially available operating system.

A user can enter commands and information into the computer 720 through a keyboard 740 and a pointing device, such as a mouse 742. Other input devices (not shown) can include a microphone, a joystick, a game pad, a satellite dish, a scanner, or the like. These and other input devices are often connected to the processing unit 721 through a serial port interface 746 that is coupled to the system bus, but may be connected by other interfaces, such as a parallel port, a game port or a universal serial bus (USB). A monitor 747 or other type of display device is also connected to the system bus 723 via an interface, such as a video adapter 748. In addition to the monitor, computers typically include other peripheral output devices (not shown), such as speakers and printers.

The computer 720 can operate in a networked environment using logical connections to one or more remote computers, such as a remote computer 749. The remote computer 749 may be a workstation, a server computer, a router, a peer device or other common network node, and typically includes many or all of the elements described relative to the computer 720, although only a memory storage device 750 is illustrated in FIG. 7. The logical connections depicted in FIG. 7 may include a local area network (LAN) 751 and a wide area network (WAN) 752. Such networking environments are commonplace in offices, enterprise-wide computer networks, Intranets and the Internet.

When employed in a LAN networking environment, the computer 720 can be connected to the local network 751 through a network interface or adapter 753. When utilized in a WAN networking environment, the computer 720 generally can include a modem 754, and/or is connected to a communications server on the LAN, and/or has other means for establishing communications over the wide area network 752, such as the Internet. The modem 754, which can be internal or external, can be connected to the system bus 723 via the serial port interface 746. In a networked environment, program modules depicted relative to the computer 720, or portions thereof, can be stored in the remote memory storage device. It will be appreciated that the network connections shown are exemplary and other means of establishing a communications link between the computers can be employed.

In accordance with the practices of persons skilled in the art of computer programming, the subject invention has been described with reference to acts and symbolic representations of operations that are performed by a computer, such as the computer 720, unless otherwise indicated. Such acts and operations are sometimes referred to as being computer-executed. It will be appreciated that the acts and symbolically represented operations include the manipulation by the processing unit 721 of electrical signals representing data bits which causes a resulting transformation or reduction of the electrical signal representation, and the maintenance of data bits at memory locations in the memory system (including the system memory 722, hard drive 727, floppy disks 729, and CD-ROM 731) to thereby reconfigure or otherwise alter the computer system's operation, as well as other processing of signals. The memory locations wherein such data bits are maintained are physical locations that have particular electrical, magnetic, or optical properties corresponding to the data bits.

Figure 8:
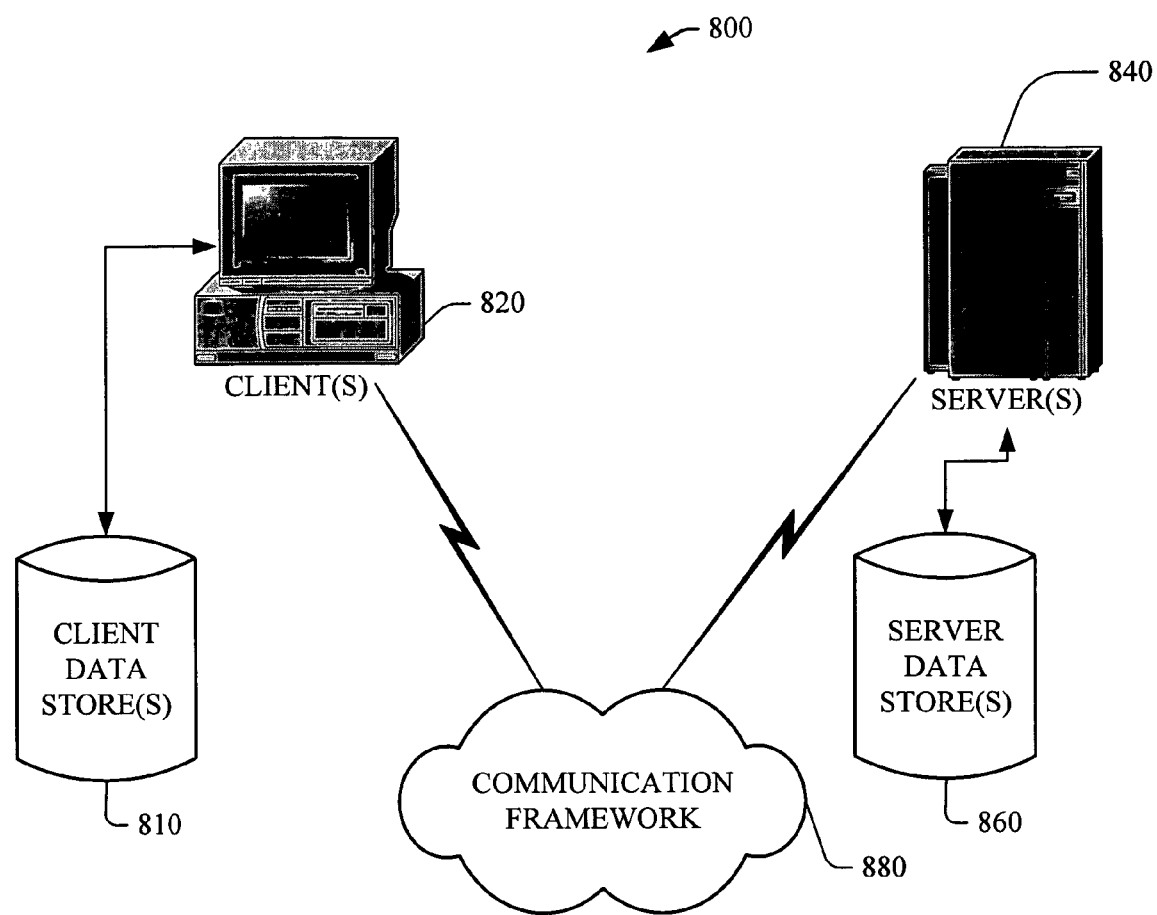
FIG. 8 illustrates a client-server system that can employ a versioning component according to one aspect of the subject invention.

Referring now to FIG. 8, a client-server system 800 that can employ a versioning component according to one aspect of the invention is illustrated. The client(s) 820 can be hardware and/or software (e.g., threads, processes, computing devices). The system 800 also includes one or more server(s) 840. The server(s) 840 can also be hardware and/or software (e.g., threads, processes, computing devices). For example, such servers 840 can house threads to perform transformations by employing the invention. The client 820 and the server 840 can communicate, in the form of data packets transmitted according to the subject invention, between two or more computer processes. As illustrated, the system 800 includes a communication framework 880 that can facilitate communications between the client(s) 820 and the server(s) 840. The client(s) 820 is operationally connected to one or more client data store(s) 810 that can store information local to the client(s) 820. Moreover, client 820 can access and update databases 860 located on a server computer 840 running a server process. In one aspect of the invention, the communication frame work 880 can be the internet, with the client process being a Web browser and the server process being a Web server. As such, a typical client 820 can be a general purpose computer, such as a conventional personal computer having a central processing unit (CPU), system memory a modem or network card for connecting the personal computer to the Internet, and a display as well as other components such as a keyboard, mouse, and the like. Likewise a typical server 840 can be university or corporate mainframe computers, or dedicated workstations, and the like.

Although the invention has been shown and described with respect to certain illustrated aspects, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention. Furthermore, to the extent that the terms "includes", "including", "has", "having", and variants thereof are used in either the detailed description or the claims, these terms are intended to be inclusive in a manner similar to the term "comprising."

What is claimed is:

1. A computer system that facilitates data handling among participants, the system comprising:
   one or more processors;
   system memory;
   a bit bucket component;
   a versioning component, the versioning component including an update component and a discovery component, wherein the versioning component is configured to:
      receive data sent from a first participant to a second participant, the data including:
         a first data object having a first class type, the first class type inheriting from a second class type, the second class type inheriting from a third class type;
      determine that the second participant is configured to represent the second class type and the third class type but not the first class type; and
      in response to determining that the second participant is configured to represent the second class type and the third class type but not the first class type:
         separate the data of the received first data object according to multiple hierarchical levels of object-oriented inheritance by separating the data of the received first data object into:
            a first portion that includes data of the second class type and data of the third class type; and
            a second portion that includes data of the first class type;
         send the first portion of the data of the received first data object to the second participant; and
         send the second portion of the data of the received first data object to the bit bucket component;
   wherein the bit bucket component is configured to maintain the second portion of the data of the received first data object throughout a process of handling data between the first participant and the second participant such that the first participant can continue interacting with the second participant while avoiding mismatched data types;
   wherein the update component is configured to in response to determining that the second participant is not configured to represent the first class type, install a schema onto the second participant, which configures the second participant to represent the first class type; and
   wherein the discovery component is configured to discover the schema and facilitate the installation thereof onto the second participant.

2. The system of claim 1, wherein the versioning component comprises a slicing component and a dicing component that separate the data of the received first data object according to multiple hierarchical levels of object-oriented inheritance.

3. The system claim 1, wherein the bit bucket component persistently stores the second portion of the data of the received first data object throughout at least one of a serialization process and a deserialization process, to enable continuous interaction among the first and second participants.

4. The system of claim 3, wherein a format of the bit bucket component, which persistently stores the second portion of the data of the received first data object to enable continuous interaction among the first and second participants, is XML.

5. The system of claim 1, wherein each participant defines a schema set with types that collectively form a type hierarchy.

6. The system of claim 1, wherein the versioning component identifies a mismatch occurrence due to at least one of a disparity in a version of a data type definition and a missing definition.

7. The system of claim 1, wherein the third class type is an abstract class type that is available to all participants.

8. A method that facilitates data handling among participants, the method performed by a computer system including one or more processors and system memory, the method comprising:

receiving data sent from a first participant to a second participant, the data including:
  a first data object having a first class type, the first class type inheriting from a second class type, the second class type inheriting from a third class type;
determining that the second participant is configured to represent the second class type and the third class type but not the first class type; and
in response to determining that the second participant is configured to represent the second class type and the third class type but not the first class type:
  separating the data of the received first data object according to multiple hierarchical levels of object-oriented inheritance by separating the data of the received first data object into:
    a first portion that includes data of the second class type and data of the third class type; and
    a second portion that includes data of the first class type;
  sending the first portion of the data of the received first data object to the second participant; and
  sending the second portion of the data of the received first data object to a bit bucket component, the bit bucket being configured to maintain the second portion of the data of the received first data object throughout a process of handling data between the first participant and the second participant such that the first participant can continue interacting with the second participant while avoiding mismatched data types; and
in response to determining that the second participant is not configured to represent the first class type:
  discover a schema, which configures the second participant to represent the first class type; and
  install the schema onto the second participant.

9. The method of claim 8, wherein the bit bucket component persistently stores the second portion of the data of the received first data object throughout at least one of a serialization process and a deserialization process, to enable continuous interaction among the first and second participants.

10. The method of claim 9, wherein a format of the bit bucket component, which persistently stores the second portion of the data of the received first data object to enable continuous interaction among the first and second participants, is XML.

11. The method of claim 8, wherein the third class type is an abstract class type that is available to all participants.

12. A computer program product for use at a computer system, the computer program product for implementing a method that facilitates data handling among participants, the computer program product comprising one or more physical computer-readable storage media having stored thereon computer-executable instructions that when executed by a processor cause the computer system to perform the following:

receiving data sent from a first participant to a second participant, the data including:
  a first data object having a first class type, the first class type inheriting from a second class type, the second class type inheriting from a third class type; and
  a second data object having a fourth class type, the fourth class type inheriting from a fifth class type, the fifth class type inheriting from sixth class type;
determining that the second participant is configured to represent the second class type and the third class type but not the first class type;
in response to determining that the second participant is configured to represent the second class type and the third class type but not the first class type:
  separating the data of the received first data object according to multiple hierarchical levels of object-oriented inheritance by separating the data of the received first data object into:
    a first portion that includes data of the second class type and data of the third class type; and
    a second portion that includes data of the first class type;
  sending the first portion of the data of the received first data object to the second participant; and
  sending the second portion of the data of the received first data object to a bit bucket component;
determining that the second participant is configured to represent the sixth class type but not the fourth class type and not the fifth class type;
in response to determining that the second participant is configured to represent the sixth class type but not the fourth class type and not the fifth class type:
  separating the data of the received second data object according to multiple hierarchical levels of object-oriented inheritance by separating the data of the received second data object into:
    a first portion that includes data of the sixth class type; and
    a second portion that includes data of the fourth class type and data of the fifth class type;
  sending the first portion of the data of the received second data object to the second participant; and
  sending the second portion of the data of the received second data object to the bit bucket component;
wherein the bit bucket being is to maintain the second portions of the data of the received first and second data objects throughout a process of handling data between the first participant and the second participant such that the first participant can continue interacting with the second participant while avoiding mismatched data types; and
wherein the third class type inherits from an abstract class type; wherein the sixth class type inherits from the abstract class type from which the third class inherits; and wherein the abstract class type is available to all participants; and
in response to determining that the second participant is not configured to represent the first class type:
  discover a schema, which configures the second participant to represent the first class type; and
  install the schema onto the second participant.

13. The computer program product of claim 12, wherein the bit bucket component persistently stores the second portions of the data of the received first and second data objects throughout at least one of a serialization process and a deserialization process, to enable continuous interaction among the first and second participants.

14. The computer program product of claim 13, wherein a format of the bit bucket component, which persistently stores the second portions of the data of the received first and second data objects to enable continuous interaction among the first and second participants, is XML.

* * * * *